(12) United States Patent
Gaia et al.

(10) Patent No.: US 11,802,716 B2
(45) Date of Patent: Oct. 31, 2023

(54) HEAT EXCHANGE CIRCUIT FOR A GEOTHERMAL PLANT

(71) Applicant: TURBODEN S.P.A., Brescia (IT)

(72) Inventors: Mario Gaia, Brescia (IT); Roberto Bini, Brescia (IT)

(73) Assignee: TURBODEN S.p.A., Brescia (IT)

( * ) Notice: Subject to any disclaimer, the term of this patent is extended or adjusted under 35 U.S.C. 154(b) by 116 days.

(21) Appl. No.: 17/603,232

(22) PCT Filed: Apr. 8, 2020

(86) PCT No.: PCT/IB2020/053343
§ 371 (c)(1),
(2) Date: Oct. 12, 2021

(87) PCT Pub. No.: WO2020/229901
PCT Pub. Date: Nov. 19, 2020

(65) Prior Publication Data
US 2022/0186984 A1    Jun. 16, 2022

(30) Foreign Application Priority Data

May 14, 2019 (IT) .......................... 102019000006817

(51) Int. Cl.
*F24T 10/15* (2018.01)
*F24T 10/30* (2018.01)
(Continued)

(52) U.S. Cl.
CPC .............. *F24T 10/15* (2018.05); *F24T 10/13* (2018.05); *F24T 10/20* (2018.05); *F24T 10/30* (2018.05);
(Continued)

(58) Field of Classification Search
CPC . F24T 10/10; F24T 10/13; F24T 10/15; F24T 10/20; F24T 2010/50;
(Continued)

(56) References Cited

U.S. PATENT DOCUMENTS 4,059,959 A * 11/1977 Matthews ................. F03G 7/04
                                                        261/DIG. 11
4,327,561 A *  5/1982 McNeal ................... F24T 10/40
                                                        62/324.1
(Continued)

FOREIGN PATENT DOCUMENTS

EP         2676008 B1 *  3/2017  ............. F01K 25/06

*Primary Examiner* — Mickey H France
(74) *Attorney, Agent, or Firm* — R. Ruschena Patent Agent, LLC

(57) ABSTRACT

A heat exchange circuit for a geothermal plant comprising a well excavated in the rock, a casing arranged inside the well, integral with it and comprising at least a first perforated section extending along a first portion of the well and at least a second perforated section extending along a second portion of the well, the perforated sections allowing the exit and the entry of a flow of geothermal fluid contained in an aquifer, an internal duct, located inside the casing in which a heat transfer fluid flows, wherein the well, the casing and the internal duct being arranged as a substantially closed ring, except for at least one surface interruption, at least one heat-exchange section at the bottom of the well between the first portion and the second portion of the well within which the geothermal fluid transfers heat to the heat transfer fluid.

26 Claims, 13 Drawing Sheets

(51) Int. Cl.
*F24T 10/20* (2018.01)
*F24T 10/13* (2018.01)
*F24T 10/00* (2018.01)
*F03G 4/00* (2006.01)
*F03G 4/04* (2006.01)

(52) U.S. Cl.
CPC .............. *F03G 4/001* (2021.08); *F03G 4/023* (2021.08); *F03G 4/029* (2021.08); *F03G 4/031* (2021.08); *F03G 4/033* (2021.08); *F03G 4/035* (2021.08); *F03G 4/04* (2021.08); *F24T 2010/53* (2018.05)

(58) Field of Classification Search
CPC ... F24T 2010/53; F24T 2010/56; F03G 4/001; F03G 4/023; F03G 4/029; F03G 4/031; F03G 4/033; F03G 4/035; F03G 4/04
See application file for complete search history.

(56) References Cited

U.S. PATENT DOCUMENTS

| | | | | |
|---|---|---|---|---|
| 5,040,926 A * | 8/1991 | Andreasson | ............ | E04H 17/26 166/385 |
| 5,411,085 A * | 5/1995 | Moore | .................... | E21B 33/12 166/384 |
| 5,634,515 A * | 6/1997 | Lambert | ................. | E21B 10/58 165/45 |
| 6,250,371 B1 * | 6/2001 | Amerman | ........... | F28D 20/0052 165/47 |
| 6,301,894 B1 * | 10/2001 | Halff | ......................... | F03G 7/04 60/641.1 |
| 2005/0121169 A1 * | 6/2005 | McNair | ................... | F24T 10/10 165/45 |
| 2006/0048770 A1 * | 3/2006 | Meksvanh | .............. | F24T 10/20 126/620 |
| 2007/0163805 A1 * | 7/2007 | Trevisani | ................ | F24T 10/10 175/11 |
| 2007/0245729 A1 * | 10/2007 | Mickleson | .............. | F01K 23/02 60/641.2 |
| 2009/0211757 A1 * | 8/2009 | Riley | ...................... | F01K 23/04 165/45 |
| 2011/0041500 A1 * | 2/2011 | Riley | ...................... | F24T 10/30 60/641.3 |
| 2011/0192566 A1 * | 8/2011 | Marshall | ................. | F24T 10/10 165/104.19 |
| 2012/0080163 A1 * | 4/2012 | Hoffman | ................... | E21B 7/04 165/45 |
| 2012/0174581 A1 * | 7/2012 | Vaughan | ................. | F24T 10/10 290/40 C |
| 2012/0175077 A1 * | 7/2012 | Lehmann | .............. | E21B 17/046 165/45 |
| 2013/0042997 A1 * | 2/2013 | Yang | ...................... | F24T 10/30 165/45 |
| 2015/0155826 A1 * | 6/2015 | Masaryk | ................. | F16L 1/028 136/244 |
| 2015/0285226 A1 * | 10/2015 | Archambeau | ............. | F03G 7/04 60/641.1 |
| 2017/0211849 A1 * | 7/2017 | Muir | ........................ | F03G 7/04 |
| 2018/0274524 A1 * | 9/2018 | Moncarz | .................. | E21B 7/04 |
| 2018/0291880 A1 * | 10/2018 | Cairns | ...................... | F03G 7/04 |
| 2019/0055930 A1 * | 2/2019 | Muir | ........................ | F03G 7/04 |
| 2019/0093641 A1 * | 3/2019 | Sumrall | .................... | F03G 7/04 |
| 2019/0128068 A1 * | 5/2019 | Danko | ................. | E21B 47/022 |
| 2019/0145666 A1 * | 5/2019 | Berman | ................... | E21B 7/20 165/45 |
| 2020/0103128 A1 * | 4/2020 | Konyari | ................. | F24T 10/10 |

* cited by examiner

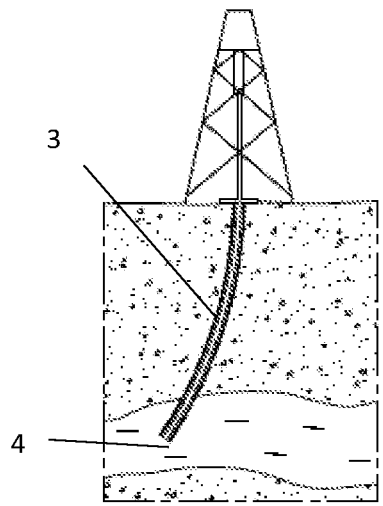
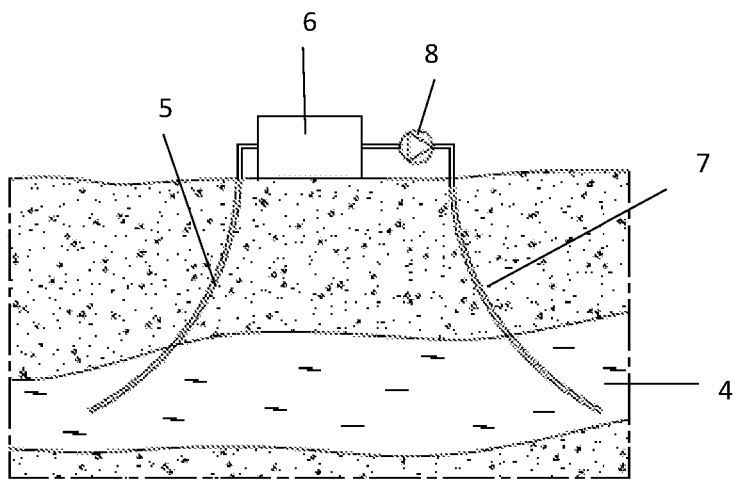
FIG.1
PRIOR ART
FIG.2
PRIOR ART
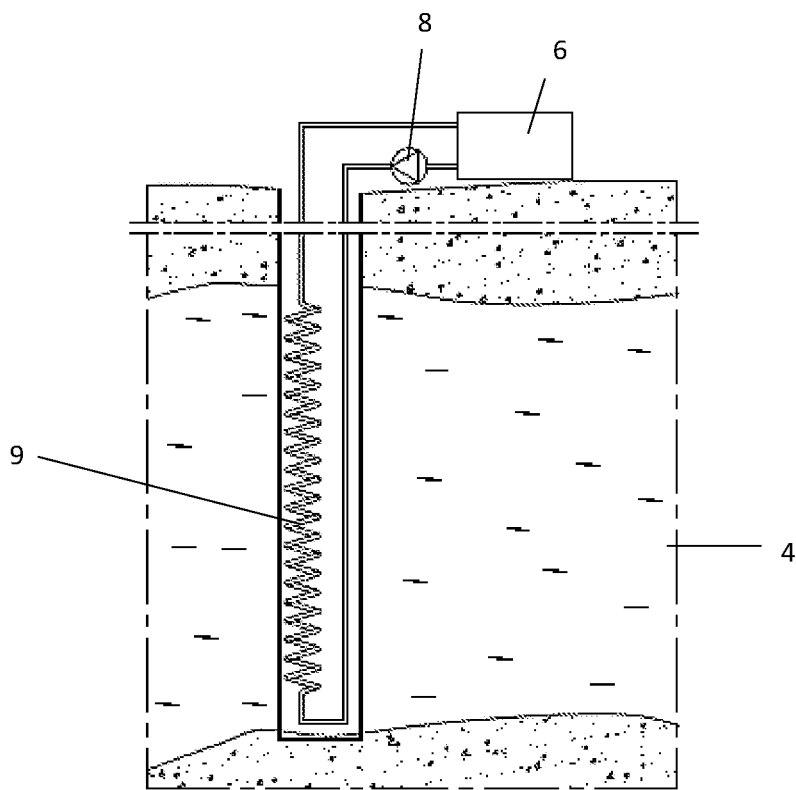
FIG.3
PRIOR ART

Sez. W-W

HEAT EXCHANGE CIRCUIT FOR A GEOTHERMAL PLANT

CROSS REFERENCE TO RELATED APPLICATIONS

This is a national stage application of PCT application PCT/IB2020/053343 having an international filing date of Apr. 8, 2020. This application claims foreign priority based on application Ser. No. 102019000006817 filed with the Italian Patent Office on May 14, 2019.

FIELD OF THE INVENTION

The present invention relates to an innovative heat exchange circuit for a geothermal plant which provides thermal energy to one or more users for the generation of electrical energy and/or for thermal storage.

BACKGROUND OF THE INVENTION

It is known that for a geothermal energy, the use of the temperature gradient is meant which is present beneath the earth surface to produce thermal or electric energy, which is one of the most promising ways to provide energy worldwide in the future. In fact, this is a reliable, predictable and in many cases cheap energy source. It is also known that, for heat recovery in geothermal applications, the adoption of an organic Rankine cycle has proven to be a feasible solution, more efficient and economical than the traditional water vapor cycle, in particular when the heat source temperature is between medium and low (i.e. lower than 250° C.) and in particular when the source is mainly in the liquid or mixed liquid-vapor phase.

Therefore, the exploitation of geothermal sources, regardless of their final use, is of considerable interest in the technical-scientific community as well as the possibility of exploiting them by reducing the operating costs of the relative plants. Most geothermal plants are using hydrothermal systems, that is, they extract heat by exploiting either hot, natural or artificially created or, again, artificially improved aquifers.

According to the known technique, a drilling auger is schematized in FIG. 1 which produces vertical or sub-vertical wells, as shown in the Figure, in the case of slim holes. The drilling activity creates a well 3 which reaches an aquifer 4. According to FIG. 2, typically at least two wells are drilled, i.e. a production well 5 within which the geothermal fluid extracted from the aquifer 4 flows, to a surface user 6 (for example, a power plant with organic Rankine cycle). The geothermal fluid, after having supplied heat to the plant, is then fed to a re-injection well 7 reaching the aquifer 4 in a position relatively remote from the production well, in order to avoid feeding the user 6 with the spent, i.e. colder, fluid. For this reason, the two wells diverge from each other in the direction towards the aquifer. One or more pumps (for example re-injection pump 8) can be installed along the path of the geothermal fluid, in order to keep it pressurized at the right level. Instead of two wells, it is possible to adopt a single well with concentric pipes (as described, for example, in US 2007/0163805 A1).

An alternative to the obvious solution to raise the geothermal fluid from the aquifer to ground level is the adoption of the so-called "bottom-well heat exchanger", or "down-hole heat exchanger" according to the English terminology. Such heat exchanger for geothermal plants has been proposed in the past in a number of different configurations. FIG. 3 shows a very simplified diagram of a bottom-well heat exchanger 9.

Basically, the idea is based on the following steps:
* supplying a fluid heat transfer medium, suitable to carry the heat (typically water, but also other fluids, such as CO2, diathermic oils, hydrocarbons or other organic fluids) which is transferred to the bottom of a geothermal well through a suitable adduction duct which starting from the surface reaches the bottom of the geothermal well;
* the heat transfer fluid flows through the bottom-well heat exchanger "downhole heat exchanger", which is positioned on the bottom of the well and receives heat from a flow of high temperature geothermal fluid, either by direct conduction of heat from the surrounding rock at high temperature. In any case, the heat reaches the flow of the transfer fluid through a physical metal wall;
* the heat transfer fluid at high temperature is then transferred to the surface by means of an outlet flow (from the bottom toward the surface) which is separated from the inlet duct;
* the heat transfer fluid at high temperature, once having reached the surface, is therefore used in an adequate process (for example for producing electricity in a power plant 6). In the process, the heat transfer fluid is cooled and can be returned to the adduction duct by means of a special circulation pump 8.

In the case of use of the geothermal fluid from an aquifer, the bottom-well heat exchanger has numerous advantages compared to the usual geothermal fluid transfer pattern on the surface, through a first well (the production well), used at the surface level (for example for producing electricity in a power plant), then by reintroducing (partially or entirely) the geothermal fluid through a second well (the re-injection well). In more detail, the following advantages are achieved:
* the geothermal fluid remains substantially at the same depth in the aquifer, and then it remains almost at the same pressure, while it releases its energy content. As a result, separation in several stages can be avoided. This is particularly important for fluids having a high content of dissolved gases, such as CO2. On the contrary, if the fluid is raised towards the surface, with the consequent decrease of the hydrostatic load, the only way to keep CO2 dissolved is to pressurize the fluid at high pressure by means of a suitable pump;
* as the geothermal fluid has not been transferred to the surface, it is possible to avoid a surface pollution due to the content of dissolved compounds or carried by the geothermal fluid.

However, the bottom-well heat exchanger is not commonly used, as it also has several disadvantages. In particular:
* within the well, the adduction duct must be thermally insulated from the outlet duct. Due to the high pressure and high temperature, closed-cell foams cannot be used. A good solution would be to adopt volumes in which to create a vacuum. In any case, the insulation between two ducts in the same well considerably reduces the useful area of the cross-section and consequently also increases the overall cost of the plant per unit of power produced;
* any maintenance activity concerning the bottom-well equipment requires to remove the equipment from the bottom, by lifting it to the surface. This operation requires to lift, separate and store on the surface, any single element of the pipe to which the equipment is connected. By way of example, the replacement of a relatively small device such as an electric pump at 800 m depth requires approximately one month of uninterrupted work.

There is therefore a need to obtain the typical advantages of a deep heat exchange, or inside the geothermal well, while allowing easy maintenance and/or replacement of components.

SUMMARY OF THE INVENTION

A purpose of the present invention is therefore to provide a heat exchange circuit for a geothermal plant which allows to obtain the aforementioned advantages typical of heat exchange at the bottom of a well, that is, without the need to move the geothermal fluid towards the surface. At the same time, however, the invention must allow an easy and fast transfer of the equipment which is present inside the well, towards the surface, for the maintenance or replacement of components.

These purposes are achieved by a heat exchange circuit for a geothermal plant which includes a well dug into the rock for reaching an aquifer and arranged in a substantially closed ring, except for an interruption on the surface. Inside the well a casing is inserted, that includes at least one first extended perforated section along a first portion of the well and at least a second perforated section extended along a second portion of the well.

According to a first aspect of the present invention, the perforated casing sections allow an inlet and an outlet of a geothermal fluid flow contained in the aquifer. An internal duct is positioned inside the casing in which a heat transfer fluid flows, so that at least one bottom-well heat exchange section is formed, within which the geothermal fluid transfers heat to the heat transfer fluid.

In this way, according to the present invention, it is not necessary to move the geotherm al fluid up to the surface, in order for the heat transfer of the geothermal source to the working fluid to take place on the surface.

According to another aspect of the present invention, the heat exchange circuit and in particular the internal duct is connected to at least one user for the use of thermal energy or for the generation of electrical energy (or a combination thereof), who is located on the surface. This allows the heat transfer fluid, which has acquired heat energy from the geothermal source, either to give heat to a plant for the generation of electrical energy, for example by operating with a Rankine cycle or an organic Rankine cycle or a gas, or to transfer heat to a thermal user.

According to a further aspect of the present invention, there are interception means which seal the inner duct when it is detached from the surface users, and translation means configured to move the inner duct making it translate in any of its points, so that the portion used for the downhole heat exchange may rise to the surface and so allowing its simple and quick maintenance. The advantage of the present invention resides in the fact that it is not necessary to disassemble the pieces of the inner duct as the portion used for the heat exchange goes up towards the surface. Only in some special cases, as will be seen below, it may be necessary to carry out a disassembly of the adjacent and preceding duct portion (according to the direction of movement), such portion being used for heat exchange in two or more lengths of the order of 500 m. In any case, the duct portions being adjacent and preceding the portion used as the heat exchange and being connected to it, are moved until reaching the surface through one end of the casing and they can be subsequently reintroduced in the casing itself and transferred to its inside through the opposite end of the casing itself.

Together with the portion of the inner duct, also the components dedicated to the heat exchange and/or the movement of geothermal and heat transfer fluids and/or the seals between the two fluid paths, will also raise up to the surface.

The heat exchange circuit for geothermal plants according to the present invention, shows the characteristics of the plant.

Further preferred and/or particularly advantageous embodiments of the invention are described according to the characteristics set out in the appended dependent claims.

BRIEF DESCRIPTION OF THE DRAWINGS

FIG. 1 shows schematically a drilling auger which creates vertical or sub-vertical wells according to the known art, FIG. 2 shows schematically a two-well plant for the extraction, exploitation and re-injection of geothermal fluid according to the known art, FIG. 3 shows a very simplified diagram of a bottom-well heat exchanger, according to the known art.

DETAILED DESCRIPTION OF THE INVENTION OR OF THE PREFERRED

Embodiments

The invention relates to a heat exchange circuit for a geothermal plant. For reasons of clarity, throughout the present description, the drilling method according to the so-called "Florizontal Directional Drilling" (FIDD) is reported, although the actual configuration of the obtained well is relevant to the invention, rather than the method of perforation. However, useful references of this perforation technique can be found in D. Londer et al., "The Longest Single Pipe Installation in New Zealand using HDD", chapter 2, which is intended to be incorporated herein by reference.

Figure 4:
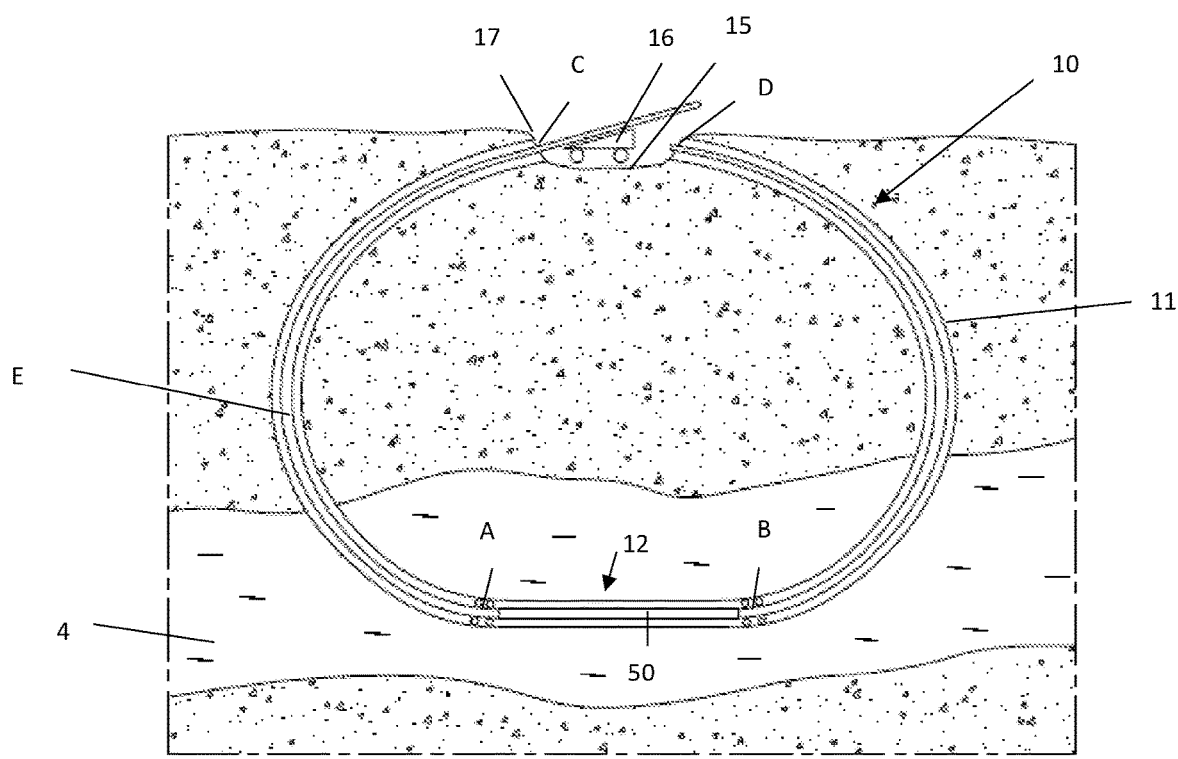
FIG. 4 shows schematically a heat exchange circuit for geothermal plants with a bottom-well heat exchanger and a respective well, according to a first embodiment of the present invention.

The heat exchange circuit, according to an aspect of the present invention, comprises a well 10 which is schematically shown in FIG. 4.

Figure 14:
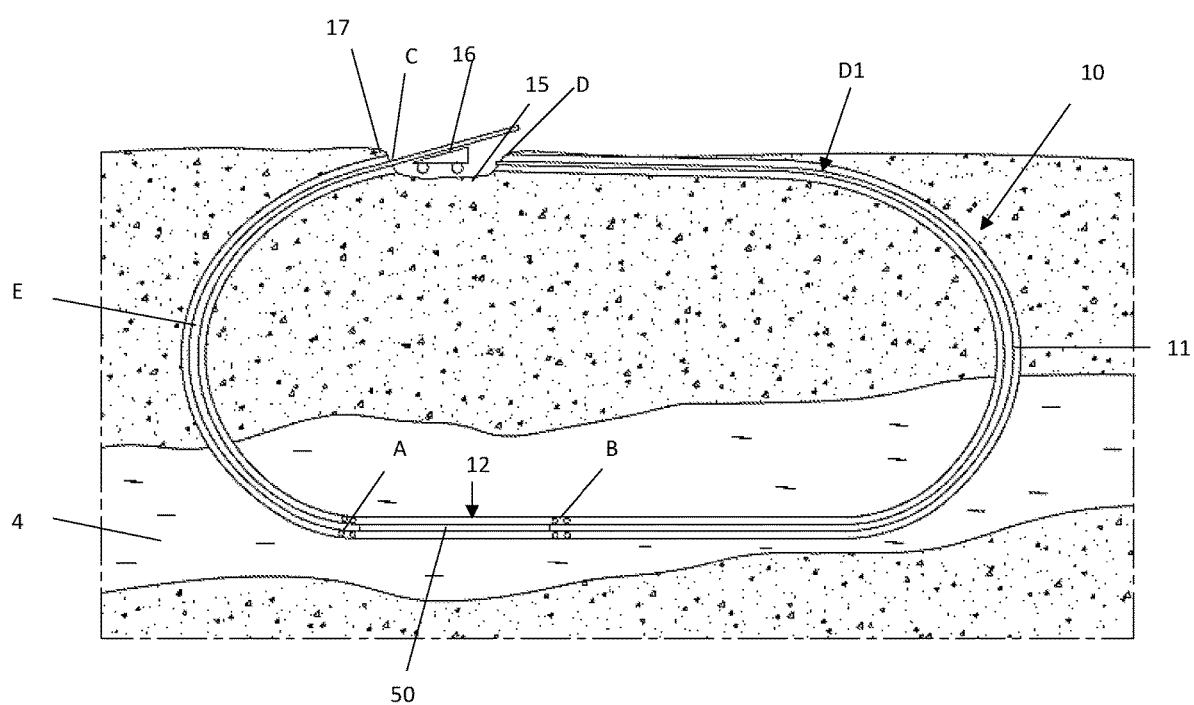
FIG. 14 shows schematically a heat exchange circuit for geothermal plants with a bottom-well heat exchanger and a respective well, according to a further alternative aspect of the embodiment of FIG. 4.
Figure 15:
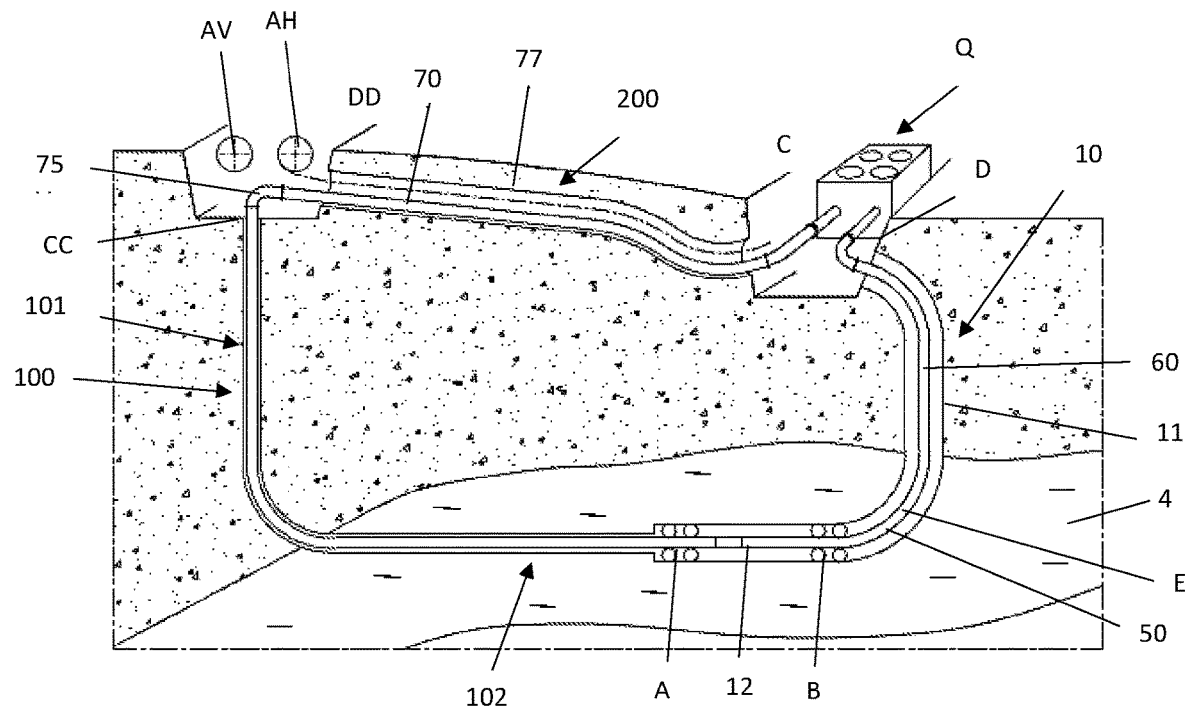
FIG. 15 shows schematically a heat exchange circuit for geothermal plants with a bottom-well heat exchanger and a respective well, in a second embodiment of the present invention.

The well 10 is perforated preferably starting from a large trench 15 with an inclined side 17. By means of a suitable equipment 16, the excavation of the well starts from this side, and proceeds deeper and deeper until it reaches the aquifer 4. It is necessary to reach a first portion A of the aquifer 4 which is characterized by a high permeability, so that it is suitable for receiving a flow, that is, a less hot flow, of the exhausted geothermal fluid flow. The perforation proceeds in a direction such as to reach a second portion B of the aquifer characterized by high temperature and a large potential reserve of geothermal fluid. The distance between the first portion A and the second portion B defines the heat exchange section 12 of the circuit and will preferably range between 200 meters and 2000 meters, for example with a distance of the order of magnitude of 1000 meters, so as to delay for as long as possible the mixing of the hot geothermal fluid with the exhausted geothermal fluid. The perforation proceeds further up to a progressively lower depth, until it reaches a point in the surface trench 15. The direction of perforation must be such that the starting point of the perforation C and the outlet point D are substantially aligned and their distance on the surface is sufficient to compensate, by remaining within the limits of the mechanical resistance of the pipe, any misalignments, indicatively of the order of 100 meters. In order to facilitate the achievement of a substantial alignment of the ends or of the access ports to the well in C and D, an effective solution, schematized in FIG. 14, consists in reaching a position D1 during the raising towards the surface, which is distant from the desired position D and is characterized by a depth compatible with the guide of the perforating apparatus from the surface. The guide of the perforating apparatus from the surface (prior art) is in fact precise and easy: if applied for a sufficient length of well it allows to obtain an effective alignment of the access ports to the wells C and D. The order of magnitude of the length of the section D1-D to be adopted is a function of the diameter of the "casing" and of the guiding precision of the deep fraction of the well. Typically, a distance of 150 meters from the outlet point aligned with the inlet point is sufficient to give an efficient alignment. If, as a consequence of this perforation procedure of the well, an extended section at a modest depth is present, it may be advantageous to structure the plant so that the low-depth section belongs to the descent section of the heat transfer fluid, rather than the raising section, so as to minimize heat losses towards adjacent rocks.

The next step is boring the well according to known techniques, in order to obtain the desired diameter and surface finish of the well.

The next step is the introduction into the well of a housing 11 or casing, having a slightly smaller diameter than the well ends C and D, substantially corresponding with the same access ports to the well. For this reason, in the following description and in the drawings, references C and D will be used indifferently in order to identify the ends of the well 10 (i.e. the starting point and the outlet point of the perforation of the well) or of the casing 11. The casing 11 is characterized by at least a first perforated section extended along the first portion A and at least a second perforated section extended along the second portion B. Once realized, the casing 11 will be blocked inside the well according to known techniques, for example by cement application. In fact, the first portion A acts as a re-injection region of the exhausted (i.e. less hot), geothermal fluid, while the second portion B acts as a production region, where, in other words, the hot geothermal fluid can transfer heat to a heat transfer fluid. The curvature of the well must be small enough to obtain an acceptable level of mechanical stress inside the casing. The choice of the type and of the perforation area, the acceptable value of the curvature of the well, the interaction between the casing and the rocks, the best positioning of the perforated areas of the casing, are all skills which are consolidated in the geothermal or "oil & gas" field and therefore it will not be further discussed in this description. Overall, the result of the described operations relates to a well 10 inside which the casing 11 is mechanically positioned. The well 10 will be realized substantially ring-shaped, with a first portion A of re-injection and a second portion B of production. The positions of the two portions A and B must be such that the re-mixing of the hot fluid in portion B with the exhausted fluid in portion A is avoided for many years. At the same time, in general, it is preferable that the two portions A and B belong to the same aquifer, so as to avoid the depletion of the water content of the production aquifer. With regard to the components of the heat exchange circuit according to an aspect of the invention, it is stated that, in the simplest case, the circulation of the geothermal fluid from the second portion B to the first portion A can take place naturally inside the casing 11, due to the pressure difference in the two positions. The geothermal fluid feeds the casing 11 due to the presence of the perforated sections.

Inside the well 10, or rather the casing 11, an internal duct E, preferably with a circular section, is introduced. As said, the curvature of the well must be small enough so as to obtain an acceptable stress level in the casing 11 but also in the inner duct E, which is be made of metal material, preferably in tempered steel, preferably in accordance with API, American Petroleum Institute, standards. Alternatively, the inner duct may have a non-circular section, in particular oval or elliptical, or it may be pre deformed to allow the reduction of the minimum radius of curvature allowed for the well along its path, if this is required by the geological conditions. Again, in order to contain the stresses induced in the inner duct E, i.e. the stresses related to the curvature of the well 10, the inner duct E may be provided with flexible elements, located at least one for each section of inner duct.

Such flexible elements could be sections of pipes or corrugations or bi-conical couplings with a general behavior due to ball joints.

The inner duct E supplies from the surface a suitable heat transfer fluid to the heat exchange section 12 between the second portion B and the first portion A. In particular, there is a portion 50 of the inner duct E included in the heat exchange section 12 having a heat exchange function. The heat transfer fluid can be water and have a single-phase full path, i.e. without reaching the evaporation temperature. Its circulation inside the duct E can be assured by a circulation pump located on the surface. In addition, the plant may have a pressurized expansion vessel. Likewise, suitable operating conditions may arise in causing the presence in the water circuit of one or more flash conditions, or even there may be generation of superheated or hypercritical steam along the underground path. Alternatively, the heat transfer fluid may be either a diathermal fluid, such as a mineral and synthetic diathermal oil, or CO2 or molten salts. The heat transfer fluid may finally be an organic working fluid, for example, cyclopentane, propane or butane, in particular "VP1" (azeotropic diphenyl-diphenyl oxide).

Figure 5:
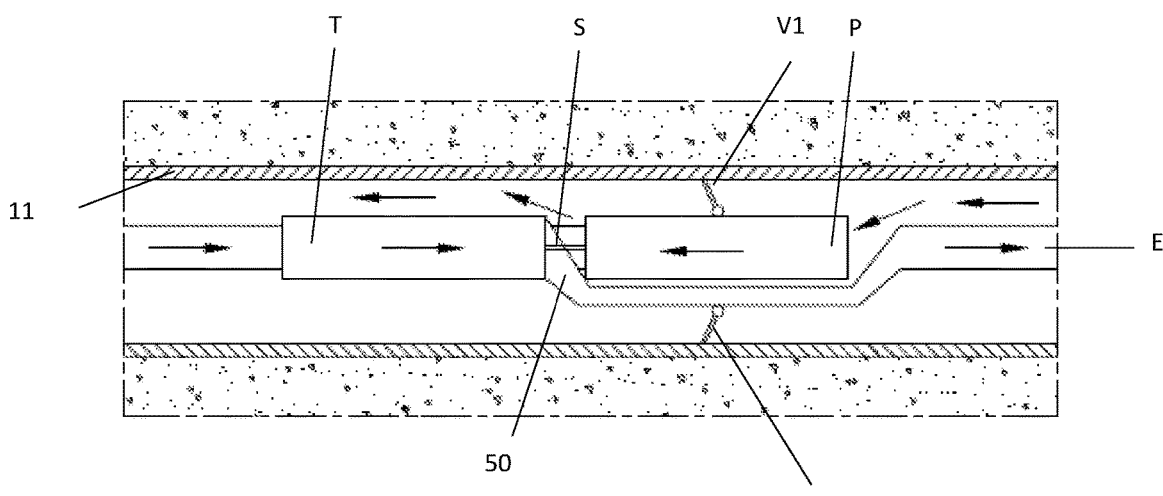
FIG. 5 is a detail of the portion deeply located in the circuit of FIG. 4, in which there is a circulation pump for the geothermal fluid and a hydraulic turbine driven by a heat transfer fluid.

In the active or heat exchange section 12, the heat transfer fluid receives thermal energy from the geothermal fluid by performing a heat exchange, preferably in counter-current way. Therefore, the active section 12 represents to all purposes a heat exchange section 12 located at the bottom of the well, where in its most essential form, the heat exchanger at the bottom of the well consists of the casing 11 and the inner duct E, with the heat transfer fluid (exchanged heat receptor) inside the inner duct E and the geothermal fluid (transferring the exchanged heat) outside the duct E and inside the casing 11. Downstream of the active section 12, the heat transfer fluid inside the duct E is transferred to the end D at ground level. Alternatively, the inner duct can be divided into a number of pipes separated from each other, so as to constitute a tube bundle exchanger or in any case to assume a structure suitable for optimizing the heat exchange with the flow of the geothermal fluid. The favorable pressure difference of the first portion A with respect to the second portion B can be established by adopting a lower depth for the portion B with respect to the portion A, so as to obtain a radiator effect, due to the increase in density of the geothermal fluid during its progressive cooling in contact with the inner duct. With reference to FIG. 5, in the case of a nonconductive or insufficient geothermal fluid, the heat exchange section 12 can include a circulation pump P for pushing the geothermal fluid. The pump can be powered electrically, by means of a cable, from the surface. Alternatively, as shown in the Figure, a turbine T can be provided for operating the circulation pump P through a shaft S. The turbine T is positioned along the circuit of the heat transfer fluid and is driven by the latter. A suitable sealing on the shaft, non shown in the drawing, avoids transfers of heat transfer fluid to the geothermal fluid. The heat transfer fluid can be water, de mineralized water suitable for high temperature operation, CO2, diathermal oil, suitable hydrocarbons, molten salt. During the heat exchange operations, the heat transfer fluid can either remain in the liquid phase, or in any case it has no phase changes (for example a fluid in supercritical conditions), or alternatively it can evaporate during its path in the underground duct.

Figure 6:
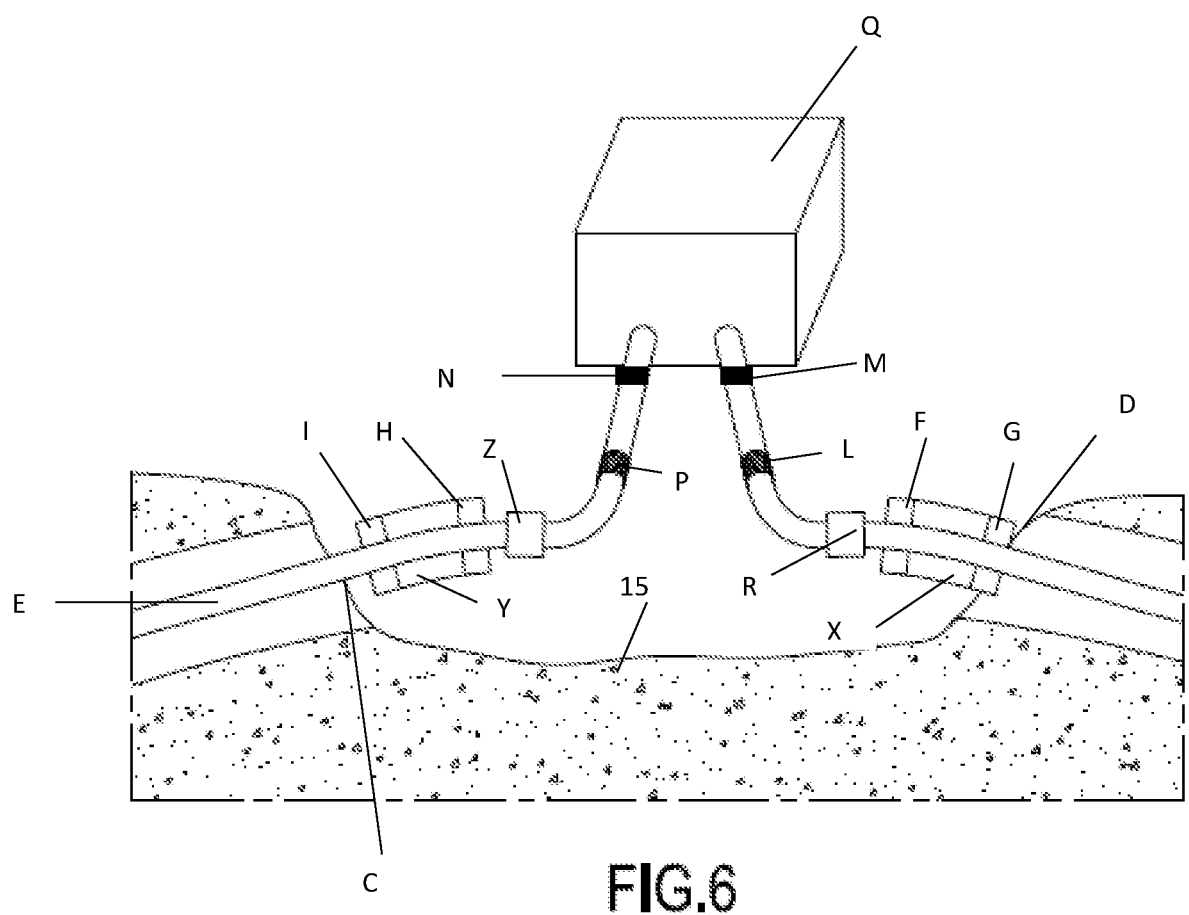
FIG. 6 is a detail of the portion located on the surface of the circuit of FIG. 4, in which the ends of the inner duct and a user of the supplied heat flow are visible.
Figure 11:
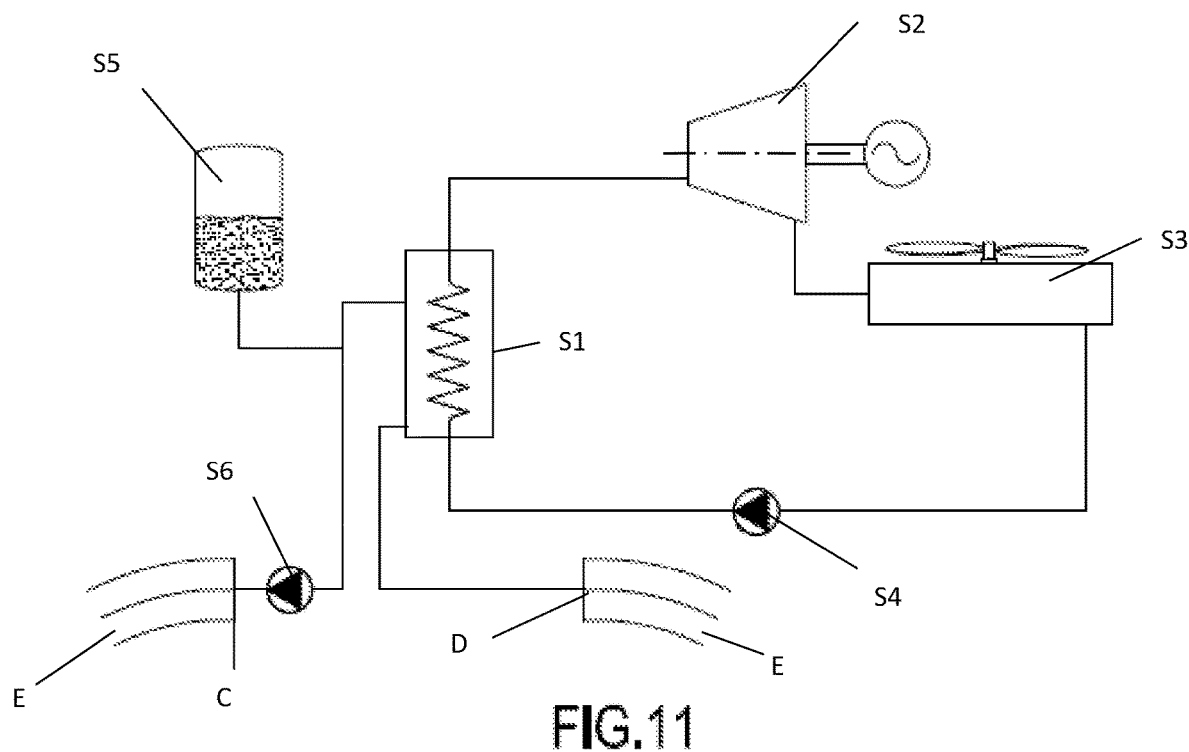
FIG. 11 is a simplified diagram of an ORC cycle (Organic Rankine Cycle), as a user of the thermal flow supplied by the circuit according to the invention.

As an alternative to a single pump, several pumps can be dedicated to the transfer of geothermal fluid, with arrangement in series or in parallel on the geothermal fluid path. Each pump can be driven by a turbine, with an arrangement preferably in series on the path of the fluid transfer path, supplied by the inner duct. With reference to FIG. 6, in the surface section the end D of the duct E is connected with the user Q. Such user m ay typically be a plant for the production of electric energy, preferably by means of an ORC cycle (Organic Rankine Cycle). For this case a possible simplified diagram is shown in FIG. 11. The heat transfer fluid from the underground is supplied from the exit D to a system of heat exchangers S1 between the heat transfer fluid and the organic working fluid. According to the known technique, the organic working fluid in the vapor phase expands in a turbine S2 providing useful work, passes through a condenser S3 (with a cold source with air or other fluid) and returns to the liquid phase. A supply pump S4 brings the organic working fluid back again to the entry of the heat exchanger system S1. A circulation pump S6 sends the heat transfer fluid, which has transferred its heat to the organic working fluid, to the end C of the well. The circuit can be characterized by the presence of an expansion vessel S5 of the content of the internal duct E and of the exchanger S1 and of related connections, in the presence of significant temperature variations. The expansion vessel therefore represents a plenum chamber for pressurizing the circuit corresponding to the internal duct E, according to the prior art.

As an alternative to the Rankine cycle with an organic fluid, it is possible to use a Rankine cycle with an inorganic fluid, in particular a water vapor cycle. In this case, liquid water (or in any case a two-phase fluid with a low vapor content) is preferably brought to the surface and then a cycle is carried out on the surface with one or more flashes, which supplies the known steam turbines. Being the steam free of contaminants, the entire steam system is much less expensive and more reliable than the usual plant with geothermal fluid steam.

Figure 12:
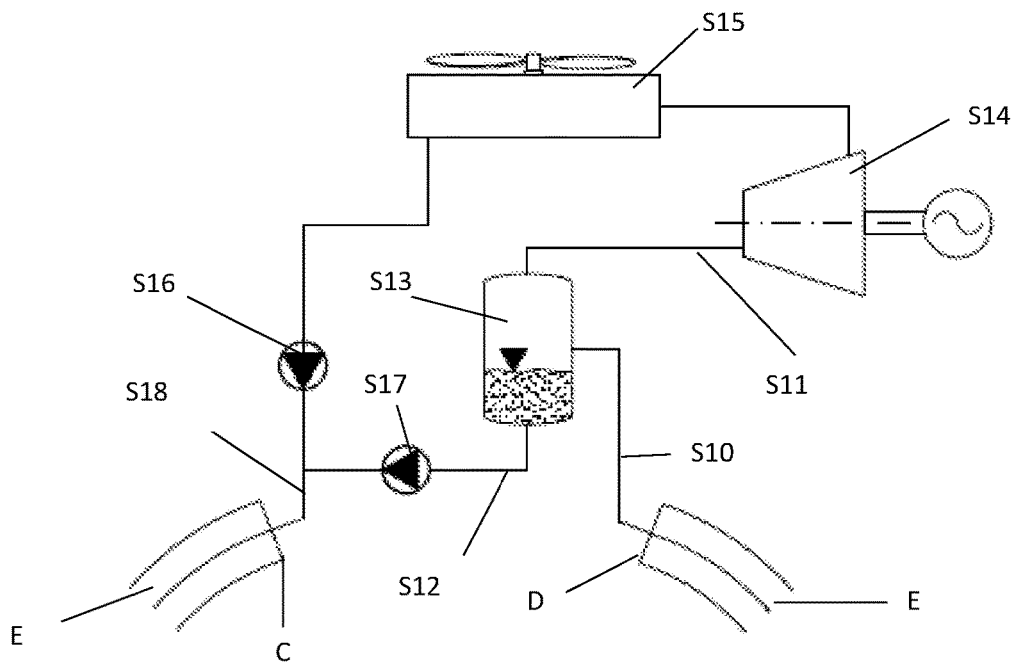
FIG. 12 is a simplified diagram of a single flash steam cycle, as user of the thermal flow supplied by the circuit according to the invention.
Figure 13:
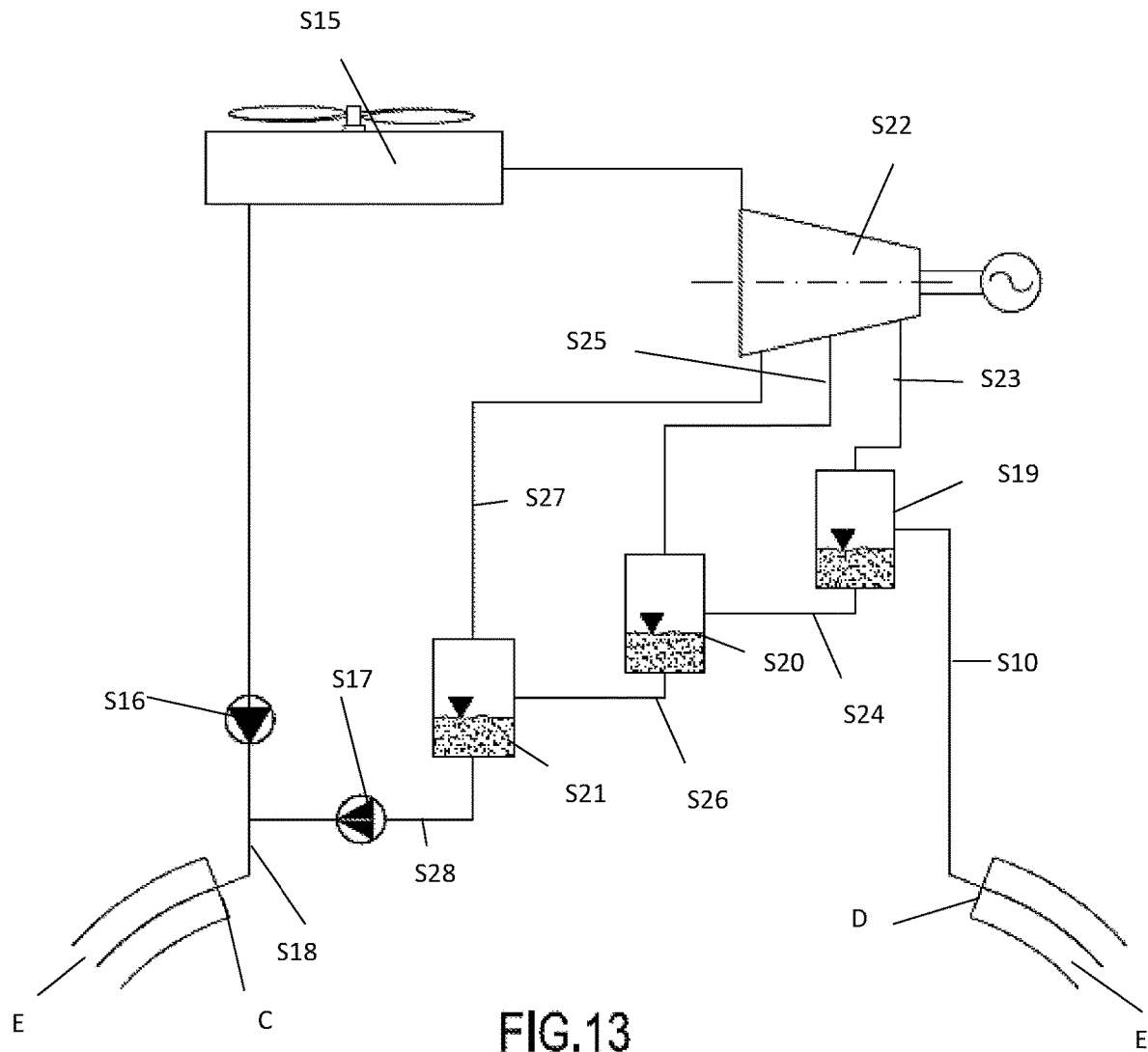
—FIG. 13 is a simplified diagram of a triple flash steam cycle, as a user of the thermal flow supplied by the circuit according to the invention.

The corresponding simplified plant diagrams are shown in FIG. 12 (plant with a single "flash") and in FIG. 13 (plant with triple "flash"). In particular, according to the diagram of FIG. 12, the heat transfer fluid coming from the duct E arrives, through a supply duct S10, from the internal duct E of the well 10 to a flash container S13. The live steam produced, through the pipe S11 is expanded in the steam turbine S14 and subsequently returns to the liquid state in the condenser S15. An extraction pump S16 from the condenser pushes this liquid back toward the entry point C of the duct E. The portion of liquid from the flash container S13, driven by a possible second extraction pump S17, rejoins the portion of liquid coming from the condenser S15 and through a supply duct S18 and the heat transfer fluid enters again the duct E of the well 10. The description is simplified and the actual diagram may include other pumps, such as for example a pump separate from the pumps S16 and S17, which supplies the internal duct downstream of the confluence of the flow from the flash container and the condenser.

The triple flash plant is schematized in FIG. 13. The operating principle is the same as in the previous plant, with the only difference that the steam turbine S22 is a multi-admission turbine, being able to receive and expand the steam coming from the three flash containers S19, S20, S21 (containers crossed in series by the portions of residual liquid by means of corresponding ducts S24, S26, S28). The steam portions will reach the turbine through corresponding ducts S23, S25, S27. Each portion of steam will enter the turbine upstream of a different expansion stage, as the entire enthalpy leap is at disposal for the steam coming from duct S23, a lower enthalpy leap for the steam coming from duct S25 and an even smaller enthalpy leap for the steam coming from duct S27. The entire vapor of the heat transfer fluid will return to the liquid state through the condenser S15 and rejoined with the three portions of liquid coming from the three flash containers.

The connection between duct E and user Q is made through a pipe system, which includes the thermal expansion compensators L and M or any other means to compensate for the thermal expansion in the long underground duct, avoiding an overstressing of the material of the internal duct E.

Similarly, the return pipe towards the duct and downstream the user Q allows for the thermal expansion, by predicting the presence of additional compensators N and P. Evidently, the users on the surface may be more than one and be powered by corresponding ducts. The latter may be separated from each other, or have a supply duct in common with the internal duct, or again can have in common a manifold located at the exit of the same internal duct from the well.

Furthermore, systems can also be made in which different wells according to the invention are present, connected with the user in series or in parallel with each other, or with combinations of series and parallel connections.

In all the diagrams considered, if the turbine pump unit is present at the bottom of the well, the pump (s) present on the surface must provide the pressure increase necessary to supply the pump drive turbine with the necessary power. The modulation of the flow rate and pressure of the pump can be integrated with the actuation of variable valves or nozzles, with preferably hydraulic controls from the surface, supplied by a separate duct. In the presence of a well-bottom circulation pump, the pump itself must be equipped with a non-return valve, schematically indicated with V1 in FIG. 5, preferably a petal pump, to prevent the pumped geothermal fluid from flowing back to the entry of the pump itself.

A further way of using the invention is to use it as an electrical energy storage system with the aim of generating power when necessary, and vice versa for storing heat in the aquifer when electrical energy is not required. For this purpose, it is preferable that the user on the surface consists of two machines or of a reversible machine, capable of performing both the function of producing electric power and the function of a heat pump. As a producer of electrical power, the machine receives a high temperature fluid from the deep aquifer and transfers heat to a cold source (air or water). On the other hand, as a receiver of excess electricity, the machine transfers thermal power from the surface cold source (air or water) to the deep aquifer, raising its temperature due to the heat pump function at the expense of consuming electricity. Advantageously, this scheme can also be achieved by using two wells according to the invention, in separate aquifers which have very different temperatures. There is therefore a "hot" aquifer, presumably in the deep and a "cold" aquifer of modest depth, with an alternating flow, from hot to cold and from cold to hot, depending on the function in progress. As already said, one of the most important advantages of the present invention allows a simplification of maintenance operations.

Figure 7:
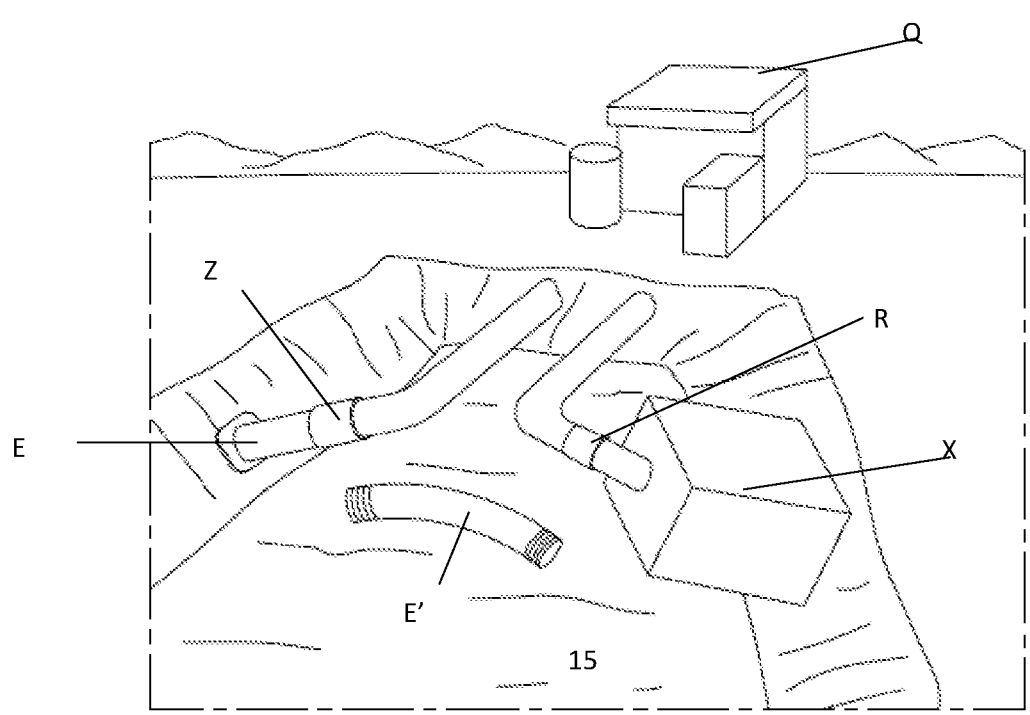
FIG. 7 is the same detail of FIG. 6, according to an alternative aspect of the implementation of the circuit of FIG. 4.

When the inner duct E, and in particular the active zone between the first portion A and the second portion B needs assistance (for example, for cleaning, replacement, repair operations), the user Q is deactivated and the heat transfer fluid is no longer supplied to the internal duct E. At this point, the connections at the end of the internal duct R and Z (for example, double cone connections) are disassembled and both ends are connected to two connectors and to any plugs. Alternatively, as shown in FIG. 7, the two ends of the internal duct E may be connected by a pipe section E', in order to achieve a closed circuit, so by keeping in mind, as already, that the starting point of perforation C and the exit point D are substantially aligned and their distance from the surface be sufficient to compensate, by remaining within the limits of the mechanical strength of the pipe, possible misalignments, indicatively of the order of 100 meters.

Figure 8:
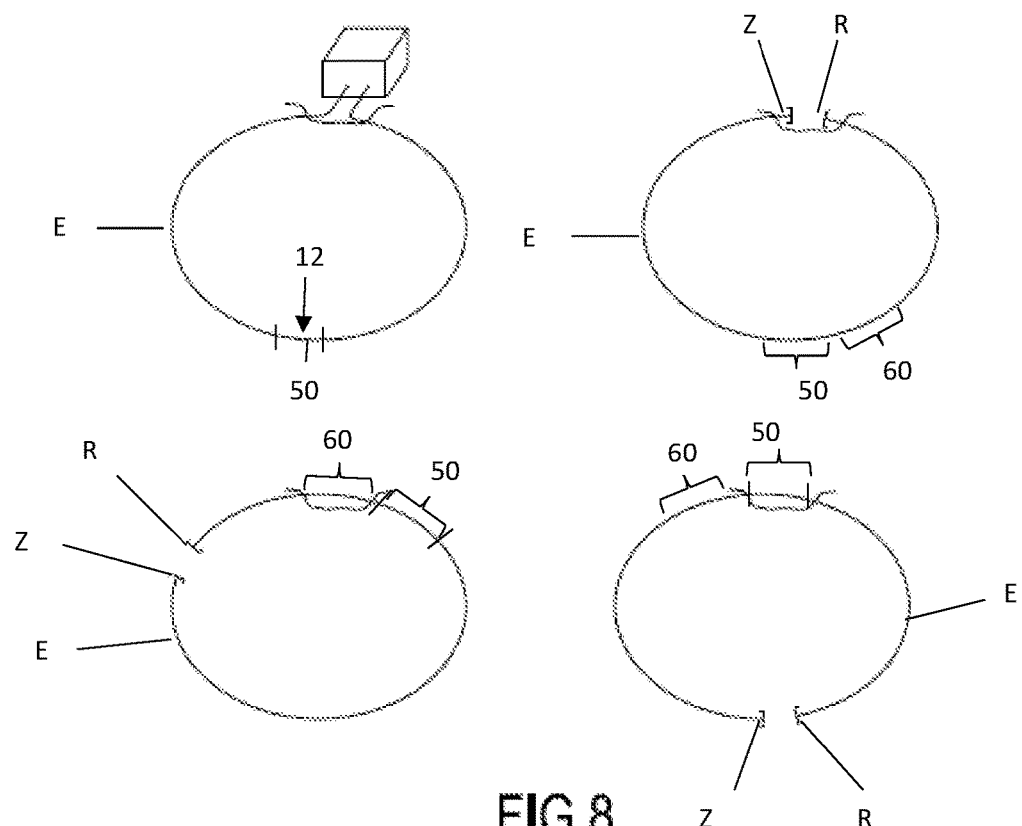
FIG. 8 shows schematically a sequence of movement of the inner duct of the circuit of FIG. 4.

The subsequent phase is the progressive operation of the mechanisms of traction X and Y, which guide the internal duct E towards the left end C of the well, until the connector R disappears into the well. The movement of the duct E (counterclockwise in the illustrated case) continues still up to when the first portion 50 of the heat exchange section 12, including the section of the heat exchanger and the pump and the turbine, reach the surface and can be adequately maintained. A sequence of displacement of the internal duct E is shown in FIG. 8:

a) separation of the aerial portion of the pipe,
b) occlusion of the ends R and Z of the internal duct E, c) displacement (for example, counterclockwise, but it can also be made clockwise) of the internal duct E. In this way, the portion 50 of the internal duct included in the heat exchange section 12, at successive times, will occupy positions progressively closer to the surface, until it passes through an end surface of the casing 11, and then be translatable out of the casing itself. This of course will be valid for any portion of the duct E. At the same time, the portions of the duct adjacent and preceding heat exchange sections 12 connected to the same (more generally, any second portion 60 of the duct E, adjacent to and prior to the first portion 50, according to the direction of translational motion), are translated until reaching the surface through one end of the casing 11 and subsequently may be reintroduced in the casing 11 itself and translated inside it through the opposed ends of the casing itself or can remain on the surface, without being disassembled, until the maintenance operations, as indicated in point d) below, are completed,
d) execution of a maintenance on the components that need it (exchanger, pump, turbine, etc.),
e) reposition of the internal duct E by moving it in the same direction or in the opposite direction to that carried out in point c). In this way, the heat exchange section 12 (more precisely, the portion 50 of the internal duct E) can be translated to further positions inside the casing 11 through the opposed end or the same end as in point c) of the casing itself, until it is accommodated in its initial operating position. Therefore, the translation of the active section can take place in the same flow or counter-flow direction with respect to the flow of heat transfer fluid during operation,
f) reconnection of the aerial section of the pipe.

The sequence described above could be simplified in the case of limited differential thermal expansion of the internal duct E with respect to the well lining. In this case the two ends R and Z of the internal conduit can be connected together by means of an additional element of the conduit E'. In this case the conduit E is handled more easily, speculates a counterclockwise rotation of the duct, if pulled by the traction mechanism X driven by the traction mechanism Y. Traction mechanisms X and Y can be any of the systems available on the market.

In the following a specific and preferred solution will be described, that allows to seal the inner duct E toward the atmosphere during the entire movement of the duct itself. The sealing may be necessary to avoid the expulsion of hot geothermal fluid to the surface (typically a fluid with two or more phases resulting from the high temperature of the liquid flash, then it is vapor, CO2, CH4, or any other gas or vapor).

Figure 9:
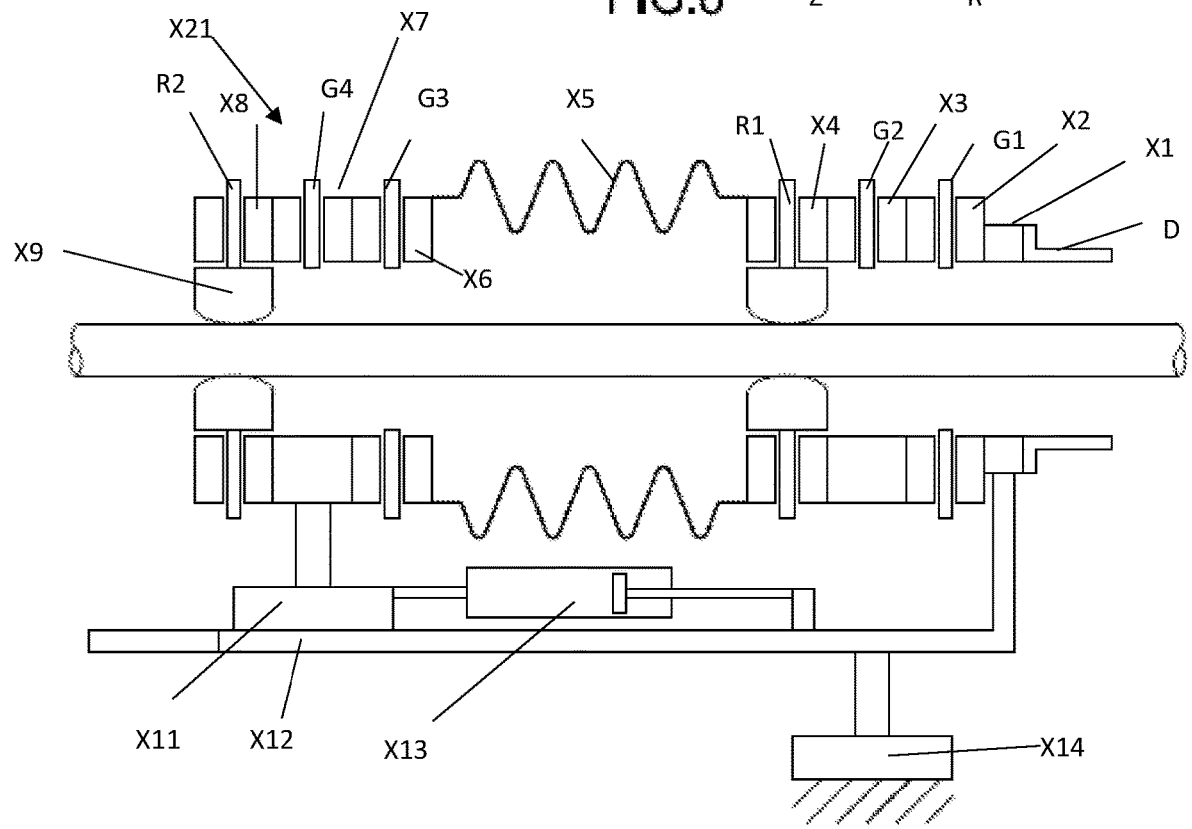
FIG. 9 shows an embodiment of the invention to pull the inner duct up to the surface of the circuit of FIG. 4.

A solution for pulling the tube, according to another aspect of the invention, is shown in FIG. 9, with reference to the traction mechanism X of the right side. The opposite traction mechanism Y is specular to the traction mechanism X. The reference D indicates the surface of the casing 11. Sequentially with respect to this end of the casing 11 the following elements are bolted (or in any way connected in any suitable manner):

- a flange X1 which holds a guide X12, a hydraulic actuator X13 and a sliding connection between the guide X12 and the pad X11.—a shut-off valve X2 with a shutter G1 with a substantially radial movement, shaped to adapt to the shape of the inner duct, in order to seal the fluid in the well, so creating a sealing contact with the inner duct E when it is present,
- a shut-off valve X3 with a shutter G2 provided with a substantially radial movement for the purpose of sealing the fluid inside the well, so creating a seal when the inner duct E is not present,
- two or more jaws X4 able to clamp the element R1 against the inner duct and transmit a strong axial force to the duct itself,
- an extendable bellows (or a telescopic casing) X5 able to retain the fluid at its inside.
- a support X14, for the anchorage of the traction mechanism X,
- pusher elements X9 for pulling the tube.

Figure 10:
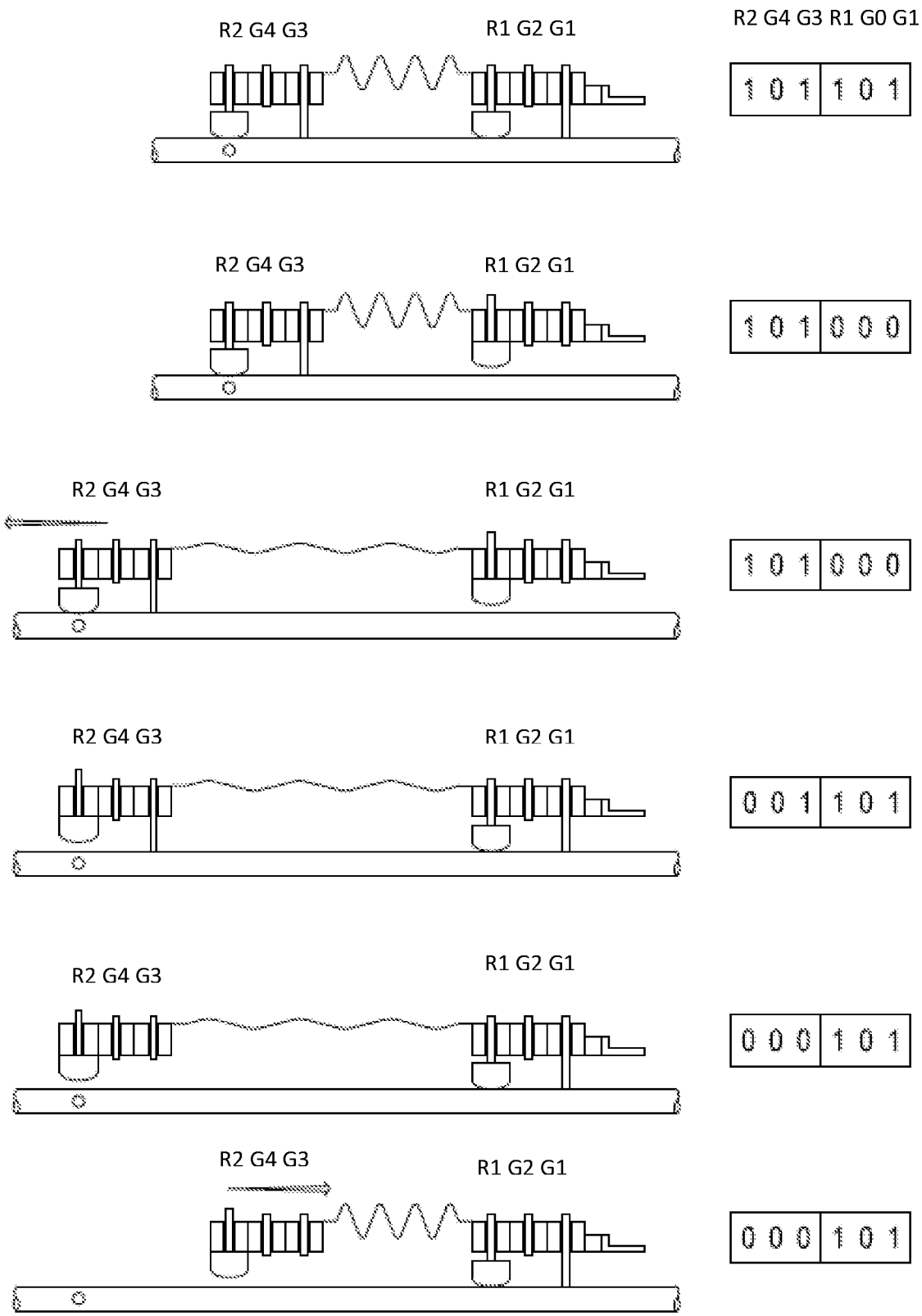
FIG. 10 shows the operating sequence in order to move the inner duct of the circuit of FIG. 4.

The elements X1 to X4 constitute the first fixed section of the traction mechanism. Corresponding and equivalent elements, X6, X7 and X8 constitute a second mobile section X21 of the traction mechanism. The operating sequence provided by the traction mechanism, in order to move the inner duct to the left side of D is described in FIG. 10, together with the corresponding True/False table (1=true=actuated, 0=false=not actuated).

Some fluid leaks occur due to the accumulation of fluid in the internal volume of the traction mechanism and to the subsequent release in the atmosphere. It is possible to provide a set of valves in order to collect the fluid and condense it in a condenser to reduce emissions to a minimum.

It should be noted that in FIG. 6 the extensible elements are represented with a curvilinear trend, while in FIG. 9, the coupling between X11 and X12 is represented with a rectilinear trend. Both solutions are possible and for example in the case of preformed internal piping the curvilinear solution may be preferable.

The adoption of the heat exchange circuit with a well-bottom exchanger should allow a drastic limitation of the emissions deriving from the production of electricity from geothermal sources, so reducing downtime for maintenance and reducing the time of plant implementation.

The present invention is also applicable if a well is already present, for example a vertical well. FIGS. 15 to 18 schematically show this further embodiment of the present invention. In this second embodiment of the invention and with reference to FIG. 15, the pre-existing well 100 is a vertical well on the descending side and comprises a first vertical portion 101 which, starting from the surface of the ground, reaches the level of the aquifer 4, and a second almost horizontal or sub-horizontal portion 102 which extends inside the aquifer itself. This may be, for example, the case of wells almost exhausted wells for the extraction of "shale gas" or gas obtained from artificially fractured clays. According to the invention, it is possible to continue the existing perforation, by creating a further perforation characterized by a small diameter that goes upwards until forming a "slim hole" which exits to the surface at point D (in this and in the following Figures where possible, the same references of the previous Figures will be used). According to known techniques, the hole will then be reamed, starting from the surface, until the desired diameter is obtained. Therefore, the well 10, in this embodiment, will include the existing perforation 100 and also the new construction. The difference with respect to what has been described up to now consists in that the existing well will be substantially vertical. Furthermore, the starting point CC of the preexisting well 100 will be rather distant from the exit point D of the new perforation due to the pre-existence of the second portion 102. Depending on the situations and the opportunities, it will therefore be necessary to make a further perforation 200 or a trench, preferably sub-horizontal but however not so deep in order to obtain the ring almost closed as in the embodiment already described, albeit characterized by the abrupt transition from the substantially horizontal direction to the vertical direction of the well.

At this point the casing 11 is introduced into the well 10 and a second casing 77 in the sub-horizontal perforation 200. Evidently, if instead of a perforation a trench should be made there would be no need for the casing. For convenience, the same reference 77 is used for the trench. Finally, the inner duct E is introduced into the casing 11, inside which the heat transfer fluid will flow. It should be noted that, being the well vertical, the inner duct E can be inserted only if it is broken down into bars. Alternatively, the inner duct can be introduced from the reamed side of the well 10 (the one on the right side in FIG. 15) and be pulled by means of the winch AV. A pair of winches AV, AH can be provided as means for moving the inner duct E for the traction in the vertical direction and for a horizontal traction respectively.

In order for the inner duct to be closed, in addition to the already described connections with the user Q, a non-translation duct 70 must be provided inside the casing 77 and therefore from point C to point DD and finally a fitting 75 which connects the non-translation duct 70 with the inner duct E during its translation inside the well 10.

All that has already been described for the other configuration is to be presently considered also in this configuration: for example, the perforated sections A and B or the heat exchange section 12 or the pump and any turbine for handling a geothermal flow (the latter two components are not shown in the Figure).

Also this solution allows a very easy maintenance procedure which is completely similar to what has already seen:
a) detach the overhead section of the pipe, in this case the corresponding connections of the inner duct E and of the non-translation duct 70 with the user Q and the fitting 75 from the duct E and the non-translation duct 70,
b) occlude the ends R and Z (see FIGS. 6 and 7) of the inner duct E, c) move, for example by means of winches AV and AH the inner duct E until translating the heat exchange section 12 (more precisely, the first portion 50) outside the casing 11,
d) perform a maintenance on the components as needed (exchanger, pump, turbine, etc.)
e) reposition the inner duct E by moving it in the opposite direction with respect to what carried out in point c),
f) reconnect the overhead sections of the piping.

As can be seen, the procedure is almost the same as previously illustrated. It is only necessary to specify what happens, during the translation of the duct E, of the generic portion 60 of the duct E, adjacent and preceding the heat exchange section 12 (more precisely, the first portion 50 according to the direction of the translation movement). Also in this case, this portion 60 can be left on the surface (or inside the trench) or be re-introduced in a casing (in this case the casing 77) until the maintenance operations are completed.

Two distinct cases can also occur which require different arrangements between them, but always falling within the idea of solution of the present invention.

Figure 16:
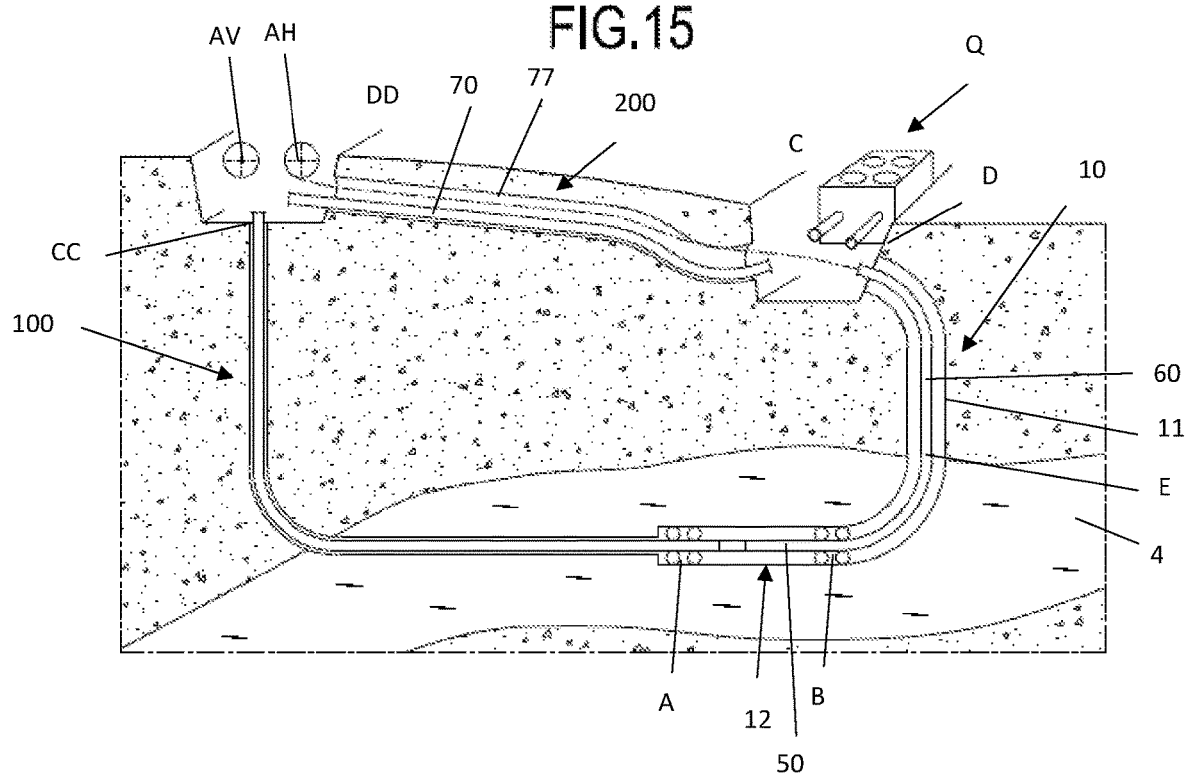
FIG. 16 represents the beginning of the surface translation operation of the circuit of FIG. 15.
Figure 17:
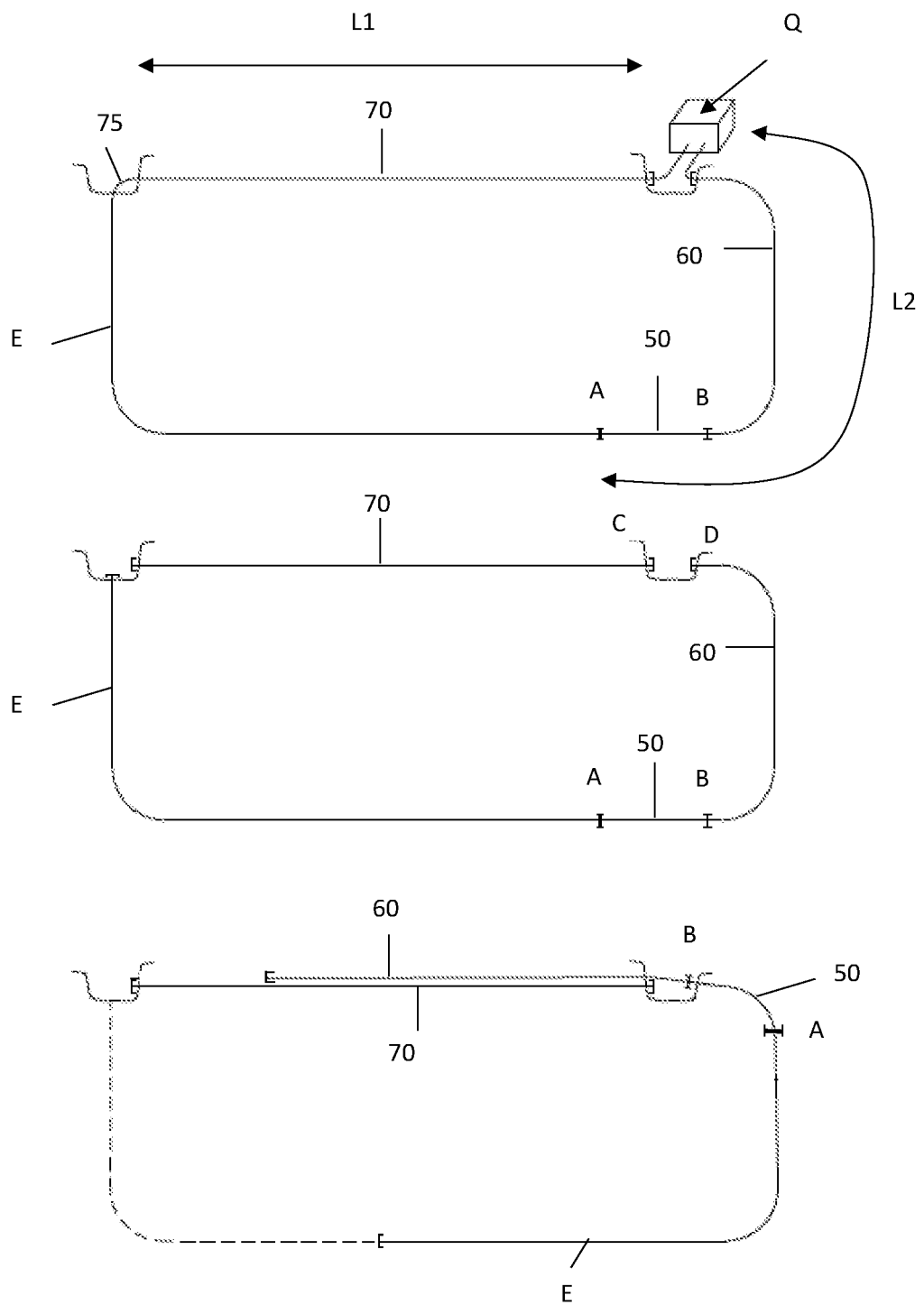
FIG. 17 shows schematically a sequence of movement of the inner duct of the circuit of FIG. 15.

With reference to FIGS. 16 and 17, the length of the casing (or trench) 77 is called L1 and the length of the inner duct E, called L2, in the section from the beginning (zone A) of the active section (of the heat exchange) 12 at the exit point D, which is the first case to be analyzed, is the one in which:

$$L1 > L2$$

In this case the casing 77 (or the trench) has a greater length with respect to the length of the inner duct E to be traveled, in order to bring to the surface the heat exchange section 12 for maintenance operations. The portion 60 of the inner duct E which precedes the heat exchange section 12 can therefore be housed within the casing 77, parallel to the non-translation portion of the inner duct 70.

Figure 18:
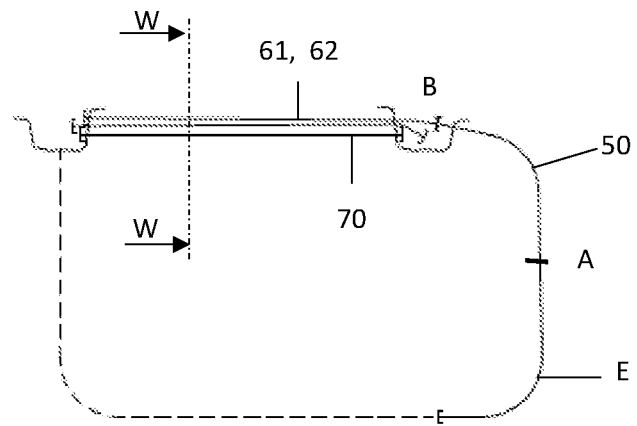
FIG. 18 shows schematically an aspect of an alternative implementation of the circuit of FIG. 15.
Figure 18:
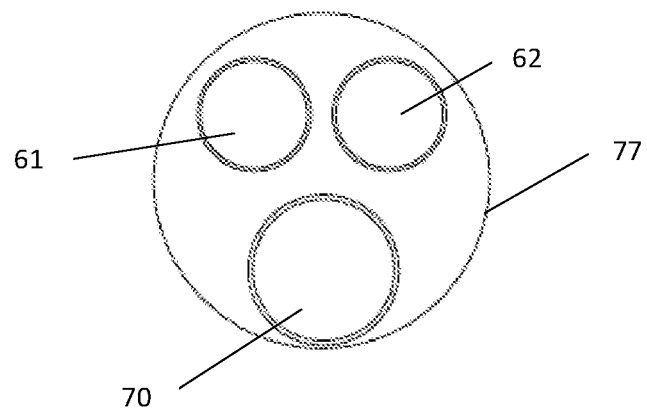

With reference to FIG. 18, in the case in which $$L1 < L2$$

the portion 60 of the inner conduit to be housed must be divided into several sections, for example in two lengths 61, 62 illustrated in the section of FIG. 18. This is however a preferable situation with respect to the extraction from a vertical well: in fact, the individual lengths can be much longer (for example, of 500 m) of the lengths, typically from about 30 m, due to the conformation of the vertical drilling towers.

Figure 19:
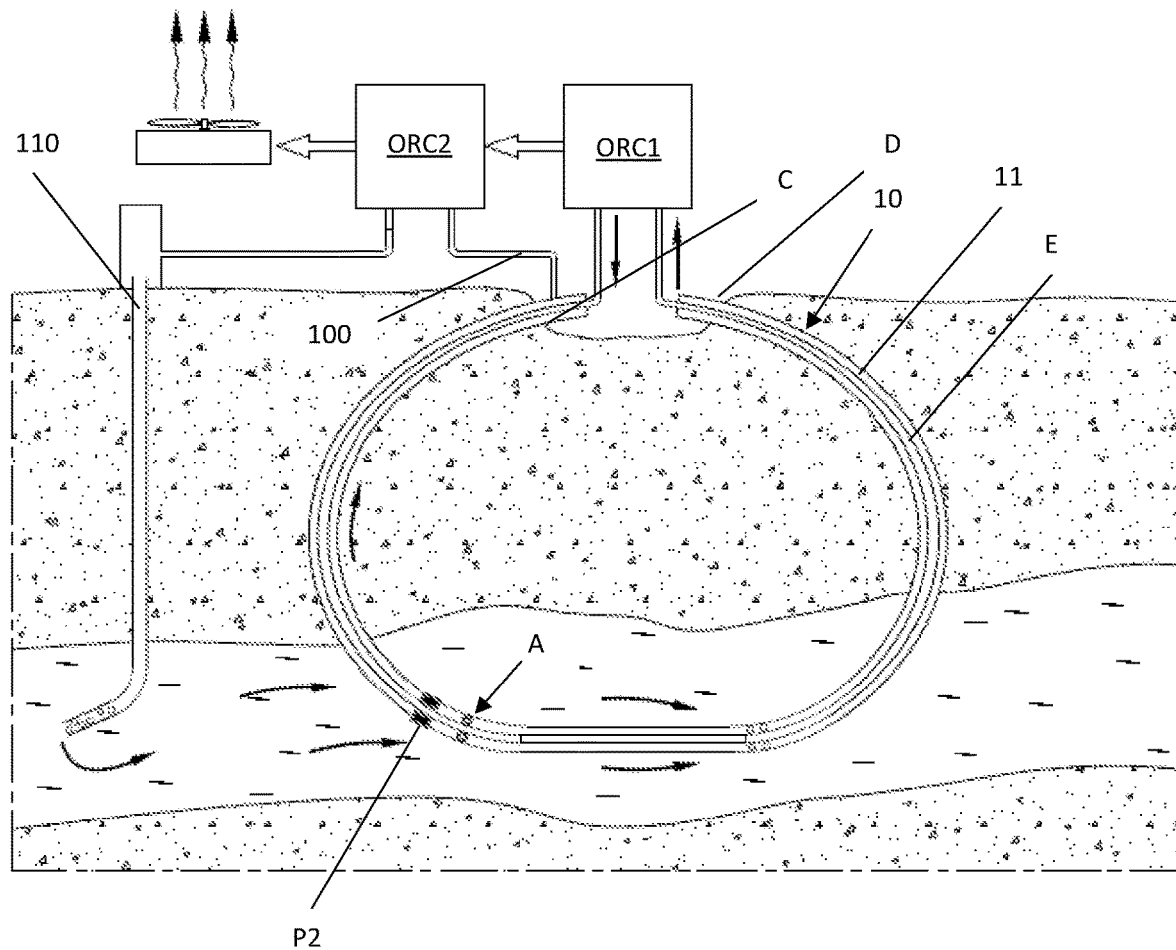
FIG. 19 shows schematically a heat exchange circuit for geothermal plants with a bottom-well heat exchanger and a respective well, in a third embodiment of the present invention.

A third embodiment of the invention is shown schematically in FIG. 19. The heat exchange circuit illustrated therein differs from the heat exchange circuit of FIG. 4 for the following characteristics:

the first perforated section extended along the first portion A, the one that acts as a region of re-injection of the less hot geothermal fluid, is configured in such a way that the surface area of the windows is reduced by a desired percentage. At most, this percentage may approach 100%. In this way the geothermal fluid will remain within the desired percentage inside the casing 11, also taking into account the permeability of the rock surrounding the perforated section. At most, in the case of a perforated section A practically equal to zero, the percentage of geothermal fluid remaining within the casing 11 tends to 100% and can be completely transferred to the surface. In an alternative configuration it is also possible to eliminate the presence of the perforated section A;

preferably, a circulation pump P2 of the geothermal fluid, in order to be able to push the geothermal fluid with the desired percentage up to the surface, or in the vicinity of point C, which is the starting point of the perforation of the well 10. This pump can coincide with the circulation pump P used in the heat exchange circuit of FIGS. 4 and 5 or can be an additional pump. What is important is that the prevalence given to the geothermal fluid is at least sufficient to bring it to the surface. The circulation pump P2, as in the case of the pump P in FIG. 4, can be powered electrically or by means of a turbine that uses the enthalpy of the heat transfer fluid;

at least one user of the heat brought in by the two fluids which are conducted to the surface or, preferably, two users of the heat. In the case of the Figure, two organic Rankine cycle plants ORC1, ORC2 are schematized, mutually in cascade, wherein the hot source of the first plant ORC1 is the heat transfer fluid with the previously described feeding modes. Instead, the hot source of the second plant ORC2 is the geothermal fluid in the percentage which is pushed to the surface.

In this way it is possible to further exploit the geothermal fluid with the further advantage of using an almost exhausted geothermal fluid, since it has cooled during the previous heat exchange with the carrier fluid. The low temperature of the geothermal fluid reduces the risk of flashing. However, should the need arise, it will be sufficient to increase the prevalence of the pump P2 to pressurize the geothermal fluid, so avoiding any risk of flashing.

Figure 20:
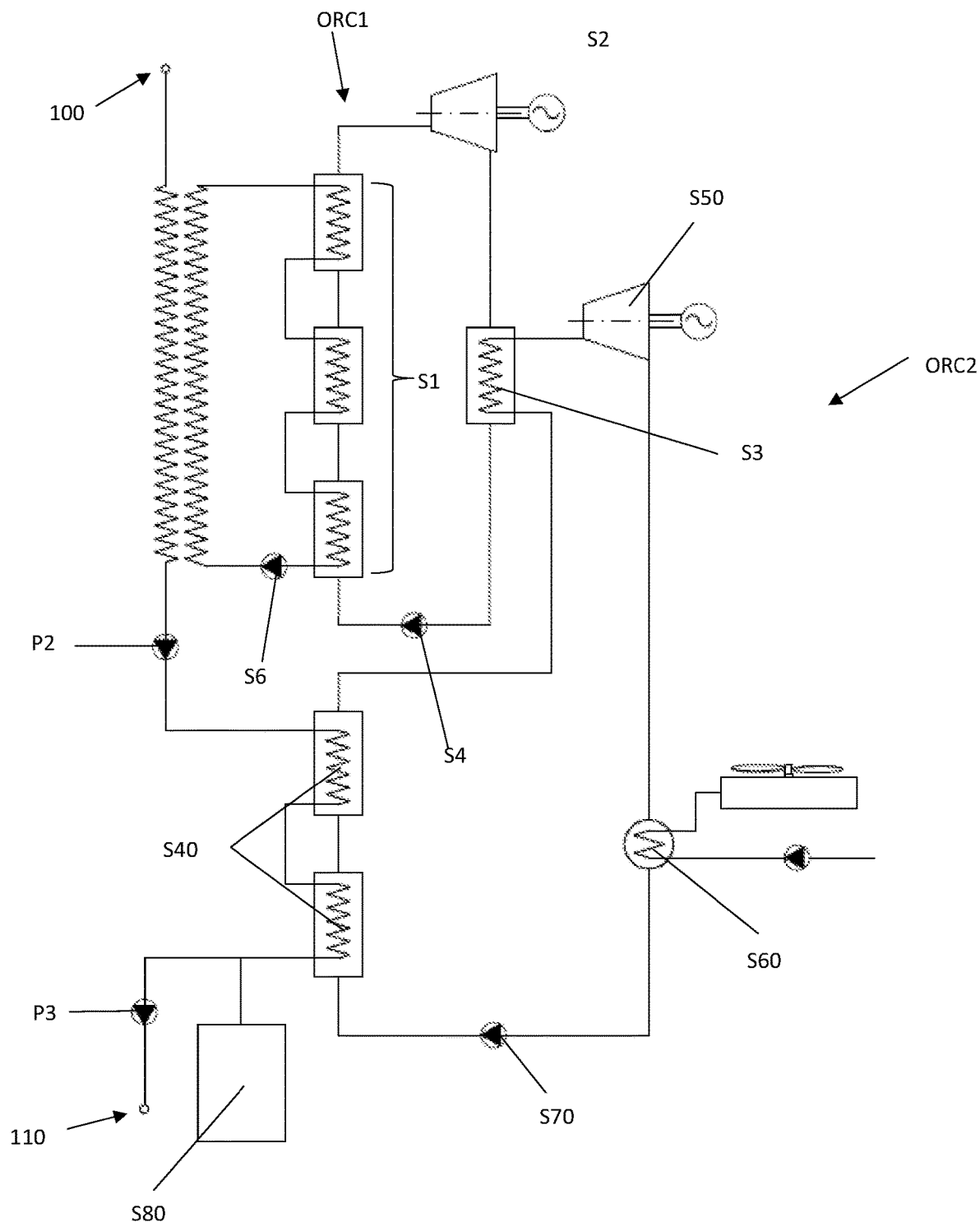
FIG. 20 is a simplified diagram of a cascade ORC cycle, as a user of the thermal flow supplied by the circuit according to the embodiment of FIG. 19.

Once having reached the outside by means of the branch 100 of the casing 11, the geothermal fluid feeds a heat exchanger S40 of the second plant ORC2 and returns to the aquifer by means of a re-injection well 110. The presence of the geothermal fluid on the surface, obviously taking care to avoid any form of pollution due to the content of compounds dissolved or transported by the geothermal fluid, also allows the recovery of important components for other applications, such as lithium or silica gel. The two plants ORC1, ORC2, mutually in cascade, are shown in FIG. 20, in one of the possible configurations. The plant ORC1 is the organic high temperature cycle and its hot source is represented by the heat transfer fluid which circulates in the inner duct E. This cycle is completely similar to that of the ORC cycle illustrated in FIG. 11. The heat transfer fluid coming from the underground is supplied at the exit D to a system of heat exchangers S1 between the heat transfer fluid and a first organic working fluid. According to known technique, the first organic working fluid in vapor phase expands in a turbine S2 providing useful work, through an S3 condenser, by exchanging heat with a second organic working fluid circulating in the second plant ORC2, and returning in liquid phase. A supply pump S4 will bring the first organic working fluid back to the inlet of the heat exchanger plant S1. A circulation pump S6 will transfer the heat transfer fluid, which has transferred heat to the organic working fluid, up to the end C of the well 10.

The plant ORC2 is the low temperature organic cycle and its hot source is represented by the geothermal fluid coming from the branch 100 and supplied by the pump P2 which, as already mentioned, exchanges heat with the second organic working fluid in one or more pre-heaters S40. Then the second organic working fluid exchanges heat with the first organic working fluid in the condenser S3 of the plant ORC1. The condenser S3, considered as a component of ORC2, is in fact the vaporizer of this plant. According to known technique, the second organic working fluid in the vapor phase expands in a turbine S50 providing useful work, passes through a condenser S60 (with a cold source with air or other fluid) and returns to the liquid phase. A supply pump S70 brings the second organic working fluid back to the entry of the heat exchanger system S40. A re-injection pump P3 supplies the geothermal fluid, which has given heat to the organic working fluid, to the re-injection well 110. Advantageously a device S80 may be arranged for the recovery from the geothermal fluid of compounds suitable to be used separately with respect to the geothermal fluid, for example lithium or silica gel compounds.

In addition to the embodiments of the invention, as described above, it is to be understood that there are numerous further variants. It must also be understood that said embodiments are only examples and do not limit neither the object of the invention, nor its applications, nor its possible configurations. On the contrary, although the above description makes it possible for the skilled person to implement the present invention at least according to an exemplary configuration, it must be understood that numerous variations of the described components are conceivable, without thereby leaving the object of the invention, as defined in the attached claims, interpreted literally and/or according to their legal equivalents.

What is claimed is:

1. A heat exchange circuit for a geothermal plant comprising:
   a well (10) excavated in the rock,
   a casing (11) arranged inside the well (10), integral with it and comprising at least a first perforated section extending along a first portion (A) of the well (10) and at least a second perforated section extending along a second portion (B) of the well (10), said perforated sections allowing the exit and the entry of a flow of geothermal fluid contained in an aquifer (4),
   an internal duct (E), located inside the casing (11) in which a heat transfer fluid flows,
   said well (10), casing (11) and internal duct (E) being arranged as a substantially closed ring, except for at least one surface interruption,
   at least one heat-exchange section (12) at the bottom of the well between the first portion (A) and the second portion (B) of the well (10) within which the geothermal fluid transfers heat to the heat transfer fluid and said at least one heat-exchange section (12) comprises at least a first portion (50) of the internal duct (E),
   at least a user (Q) for the use of thermal energy or for the generation of electrical energy or a combination thereof, located at the surface and to which the internal duct (E) is removably connected;
   and wherein said internal duct (E) is translatable inside the casing (11) so that said first portion (50) of the internal duct (E) assumes any position inside the casing (11) including a position at the bottom of the well or a position on the surface.

2. The heat exchange circuit according to claim 1, wherein a second generic portion (60) of the internal duct (E) assumes any position inside the casing (11).

3. The heat exchange circuit according to claim 1, further comprising a second casing or a trench (77) which contains a non-translating duct (70) mechanically and hydraulically connected to the internal duct (E),
   wherein the second portion (60) of the internal duct (E), due to the translatability of the internal duct (E), is allocated into the second casing or into the trench (77).

4. The heat exchange circuit according to claim 3, wherein the second generic portion (60) comprises two or more pieces (61, 62).

5. The heat exchange circuit according to claim 3, wherein, in the heat-exchange section (12) at the bottom of the well, the internal duct (E) is divided into a number of tubes separated from each other so as to constitute a tube bundle heat exchanger to optimize the heat exchange of the heat transfer fluid with the geothermal fluid.

6. The heat exchange circuit according to claim 3, wherein the second portion (B) of the well (10) is at a lower depth than the first portion (A) so as to obtain a natural circulation of the geothermal fluid during its progressive cooling in contact with the internal duct (E).

7. The heat exchange circuit according to claim 3, wherein, in the heat-exchange section (12) at the bottom of the well, there is a circulation pump (P) of the geothermal fluid.

8. The heat exchange circuit according to claim 7, wherein said circulation pump (P) is an electric pump supplied by a cable from the surface.

9. The heat exchange circuit according to claim 7, wherein said circulation pump (P) is driven by a turbine (T), positioned along the heat transfer fluid circuit and is driven by the latter.

10. The heat exchange circuit according claim 3, wherein the distance between the first portion (A) of the well (10) and the second portion (B) of the well (10) ranges between 200 meters and 2000 meters.

11. The heat exchange circuit according to claim 10, wherein the internal duct (E) is put in communication with the user (Q) through at least two ducts, equipped with expansion compensators (L, M, N, P) to avoid overstressing the material of the internal duct (E).

12. The heat exchange circuit according to claim 11, wherein the heat transfer fluid is water in a single-phase or two-phase form or with generation of superheated or hypercritical steam along the underground path.

13. The heat exchange circuit according to claim 11, wherein the heat transfer fluid is a diathermic fluid, such as mineral and synthetic diathermic oil, or CO2 or molten salts.

14. The heat exchange circuit according to claim 11, wherein the heat transfer fluid is an organic working fluid, in particular an azeotrope diphenyl—diphenyl oxide, cyclopentane, propane or butane.

15. The heat exchange circuit according to claim 11, wherein the internal duct (E) has a circular section.

16. The heat exchange circuit according to claim 11, wherein the internal duct (E) has a locally oval or elliptical section.

17. The heat exchange circuit according to claim 11, wherein the internal duct (E) is pre-deformed.

18. The heat exchange circuit according to claim 11, wherein the internal duct (E) is provided with flexible or orientable elements.

19. The heat exchange circuit according to claim 18, wherein said flexible elements are sections of corrugated tube or provided with bellows corrugations, or spherical joints, which join two sections of pipe.

20. The heat exchange circuit according to claim 18, wherein the distance between a starting point (C) of the well (10) and an exit point (D) of the well (10) is not more than 100 meters.

21. The heat exchange circuit according to claim 20, wherein a position (D1) of the well (10), different from the exit point (D) of the well (10), wherein a depth compatible with the guide of a piercing apparatus with instrumentation placed on the surface, has a distance greater than 150 meters from the exit point (D) of the well (10).

22. The heat exchange circuit according to claim 18, further comprising:
   interception means for sealing the internal duct (E) in a configuration for detachment from the user (Q), and
   translation means for moving the internal duct (E), in a configuration for detachment from the user (Q), and allowing it to move at any point.

23. The heat exchange circuit according to claim 1, wherein the area of the window surface of the first perforated section extended along the first portion (A) of the well (10)

is less than the area of the window surface of the second perforated section extended along the second portion (B) of the well (10)), so that a percentage of geothermal fluid remains contained into the casing (11);

the casing (11) includes a branch (100) that connects the casing (11) to the at least one user (Q, ORC1) and/or to at least a second user (ORC2).

24. The heat exchange circuit according to claim 23, wherein the area of the windows surface of the first perforated section extended along the first portion (A) of the well (10) is substantially equal to zero, so that the entire flow of geothermal fluid remains contained in the casing (11) and is transferred to the surface.

25. The heat exchange circuit according to claim 24, characterized in that the second user (ORC2) comprises a device (S80) for the recovery from the geothermal fluid of compounds suitable for separate use with respect to the geothermal fluid.

26. A method for the maintenance of the heat exchange circuit of claim 1, comprising the following steps:
a) detaching the aerial part of the piping,
b) occluding the ends (R) and (Z) of the internal duct (E),
c) moving the internal duct (E), so that the first portion (50) of the internal duct (E) included in the heat exchange section (12), at successive time instants, will occupy positions progressively closer to the surface, until passing a surface end of the casing (11), and therefore be translatable out of the casing itself, and so that a generic second portion (60) of the conduit (E) is translated until it reaches the surface through one end of the casing (11) and subsequently is reintroduced into the casing (11) and translated inside it through the opposite end the casing itself or left on the surface until the maintenance operations are completed, d) performing maintenance on the components that need it, e) repositioning the internal conduit (E) by moving it in the same direction or in the opposite direction to that carried out in point c), so that the first portion (50) of the internal conduit (E) is translated to further positions inside the casing (11) through the opposite end or the same end of the casing itself, as referred to in point c), until the first portion (50) is accommodated in its initial operating position, f) reconnecting the aerial section of the pipe.

* * * * *